United States Patent [19]

Kang

[11] Patent Number: 5,872,839
[45] Date of Patent: Feb. 16, 1999

[54] OFFICE LINE SELECTING TECHNIQUE OF A TELEPHONE SWITCHING SYSTEM

[75] Inventor: Uk-Jin Kang, Gumi, Rep. of Korea

[73] Assignee: SamSung Electronics Co., Ltd., Kyungki-do, Rep. of Korea

[21] Appl. No.: 785,743

[22] Filed: Jan. 17, 1997

[30] Foreign Application Priority Data

Jan. 19, 1996 [KR] Rep. of Korea .................... 1996/1165

[51] Int. Cl.[6] ...................................................... H04M 1/00
[52] U.S. Cl. ........................... 379/156; 379/157; 379/177
[58] Field of Search .................................... 379/156, 157, 379/161, 164–167, 171, 177, 207, 221, 211, 212

[56] References Cited

U.S. PATENT DOCUMENTS 3,660,611  5/1972  Knollman et al. .
4,594,477  6/1986  Noirot .
4,958,369  9/1990  Tsuchida .
5,134,652  7/1992  Brown et al. .
5,208,803  5/1993  Conforti et al. .
5,434,852  7/1995  La Porta et al. .

*Primary Examiner*—Curtis A. Kuntz
*Assistant Examiner*—Duc Nguyen
*Attorney, Agent, or Firm*—Robert E. Bushnell, Esq.

[57] ABSTRACT

An office line selecting technique of a telephone switching system includes: receiving an extension number so as to select an office line which is in an optimal state with respect to a specific extension; confirming whether the extension number can use an office line which is in an optimal state when an office line group number consisting of a plurality of office lines is selected through an extension; and connecting the specific extension to the office line which is in an optimal state.

5 Claims, 3 Drawing Sheets

OFFICE LINE SELECTING TECHNIQUE OF A TELEPHONE SWITCHING SYSTEM

CLAIM OF PRIORITY

This application makes claims all benefits accruing under 35 U.S.C. §119 from an application for OFFICE LINE SELECTING METHOD OF SWITCHING SYSTEM earlier filed in the Korean Industrial Property Office on Jan. 19, 1996 and there duly assigned Ser. No. 1165/1996.

BACKGROUND OF THE INVENTION

1. Field of the Invention

The present invention relates to telephone switching systems and, more particularly, to an office line selecting technique of a telephone switching system for selecting an optimal office line with respect to a specific extension.

2. Description of the Related Art

A private branch exchange accommodates many lines installed from a telephone office in its office line card and connects more extensions than the number of office lines thereto. Respective extensions have classes and their functions for providing service are determined according to the classes. In case of a very high class, the service of a special function may be provided. In selecting the office line, there is a method for selecting the office line using an office line number corresponding to the office line and a method for selecting the office line using an office line group number including the office line. The latter method selects the office line which is not used by sequentially judging whether the office line is being used. This method has a problem in that it is difficult to select an office line which has an optimal state with respect to the extension of a high class since the speech sensitivity and noise differ according to the office line.

The following patents each disclose features in common with the present invention but do not disclose the specifically recited combination of features of the present invention: U.S. Pat. No. 5,434,852 to La Porta et al., entitled *Distributed Processing Architecture for Control Of Broadband And Narrowband Communications Networks,* U.S. Pat. No. 5,208,803 to Conforti et al., entitled *Circuit For Testing Digital Lines,* U.S. Pat. No. 5,134,652 to Brown et al., entitled *Communication Console Station With Priority Queuing,* U.S. Pat. No. 4,958,369 to Tsuchida, entitled *Key Telephone System Accommodating Both Digital And Analog Telephone Networks,* and U.S. Pat. No. 3,660,611 to Knollman et al., entitled *Program Controlled Key Telephone System For Automatic Selection Of A Prime Line.*

SUMMARY OF THE INVENTION

It is therefore an object of the present invention to provide an office line selecting technique of a telephone switching system which can select an office line having optimal speech sensitivity with respect to a specific extension when selecting the office line using an office line group number.

It is another object of the present invention to provide an office line selecting technique of a telephone switching system which achieves the differentiation of service by selecting an office line having optimal speech sensitivity when an extension number is received.

According to one feature of the present invention, an office line selecting method of a telephone switching system for selecting an office line differentiated according to a class of an extension includes the steps of: receiving an extension number so as to select an office line which is in an optimal state with respect to a specific extension; confirming whether the extension number can use the office line which is in the optimal state when an office line group number consisting of a plurality of office lines is selected through the extension; checking each office line to measure its state and storing its state in an office line state measured result table; and connecting an specific extension to the office line which has been determined to be in the optimal state using said office line state measured table.

The office line selecting technique according to the present invention is broadly divided into two processes: a process for storing an extension number requiring the use of an office line which is in an optimal state; and a process for selecting the office line which is in the optimal state when an office line group is selected from an extension.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
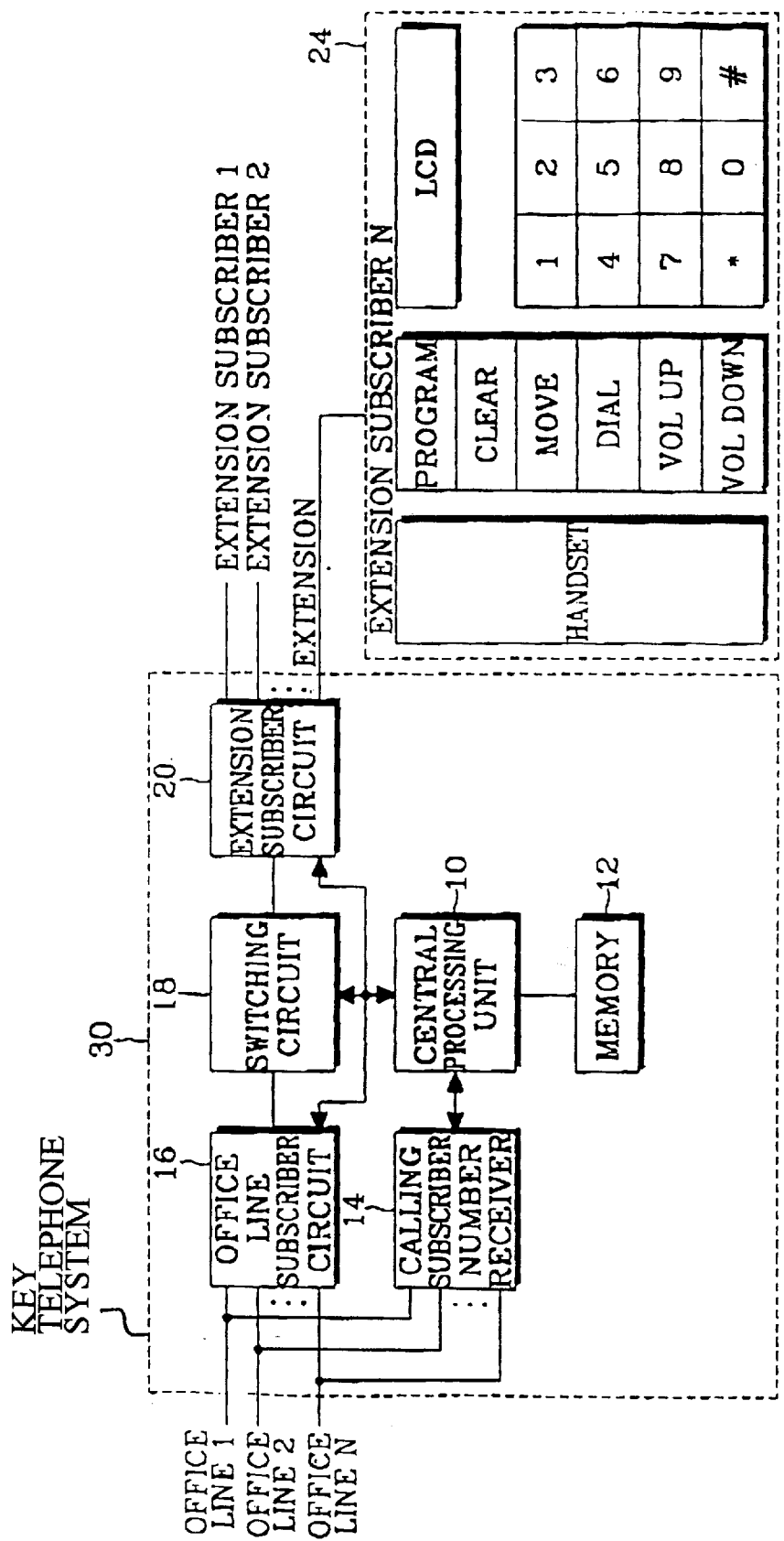
FIG. 1 is a schematic block diagram of a telephone switching system.

FIG. 1 illustrates a telephone switching system. A central processing unit 10 controls an overall operation of a key telephone system 30, and controls a caller identification (D) path formed when detecting a caller ID which is interlaced with a ring signal. Further, the central processing unit 10 controls the caller ID so as to be displayed on a specific extension by analyzing and processing the caller ID. A memory 12 stores a received calling subscriber number and a calling subscriber name corresponding to that calling subscriber number, and includes program initial service data for performing a call and various functions. An office line subscriber circuit 16 detects the ring signal received from a plurality of office lines, and forms and office line loop by seizing a corresponding office line under the control of the central processing unit 10. The office line subscriber circuit 16 also interfaces an incoming signal from the office line. A calling subscriber number receiver 14 receives the calling subscriber number which is asynchronous serial data to which a start bit and a stop bit are added during an idle interval of the ring signal under the control of the central processing unit 10 when the ring signal is detected from the office line. A switching circuit 18 switches various tones and data under the control of the central processing unit 10. An extension subscriber circuit 20 supplies a speech current of a voice band to a key telephone and a normal telephone of an extension subscriber, and implements interfacing between the extension telephone and the switching system. A plurality of extension subscriber terminals is connected to the extension subscriber circuit 20. An extension subscriber terminal 24 has a move key, a program key, clear key, a volume-up key and a volume-down key.

Figure 2:
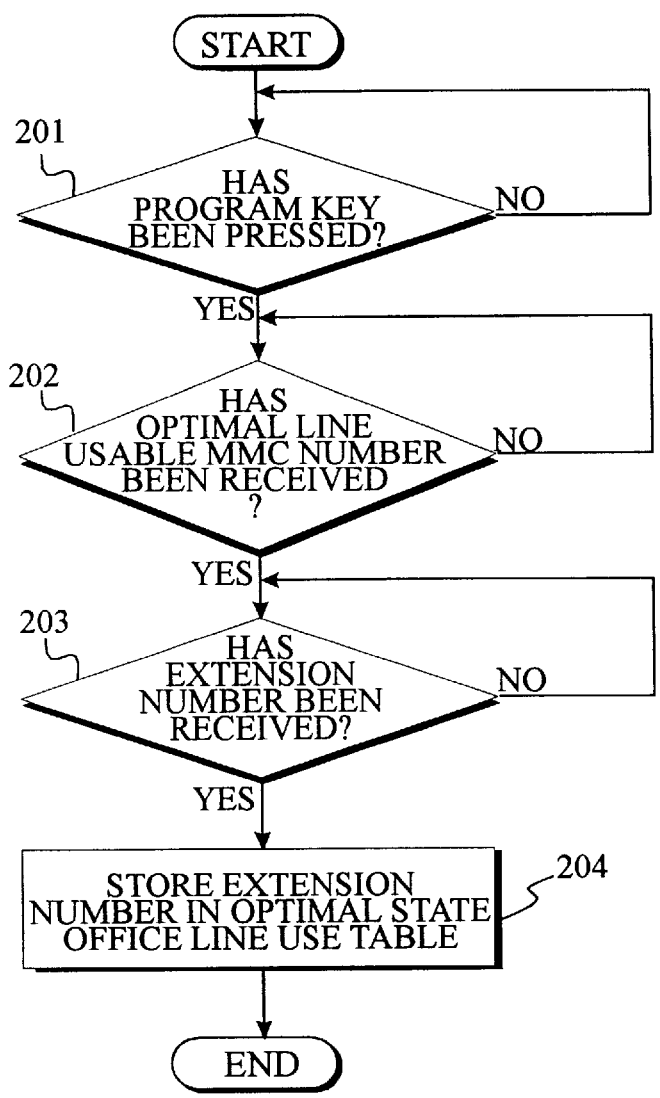
FIG. 2 is a flowchart illustrating the storing of an extension number which can use an office line of an optimal state according to the present invention.

FIG. 2 is a flowchart illustrating the storing of an extension number which can use the office line which is in an optimal state. That is, there is shown a process for storing the extension number in an optimal state office line use table. When a key has been pressed, a determination is made as to whether the pressed key is a program key at step 201. If the program key has been pressed, a determination is made as to whether an optimal line usable MMC number has been received at step 202. If so, a determination is made as to whether the extension number has been received at step 203. If the extension number has been received, the extension number is stored in the optimal state office line use table (that is, a table for storing a serial number corresponding to the number of extensions) together with the number of extensions which can use the office line which is in the optimal state.

Figure 3:
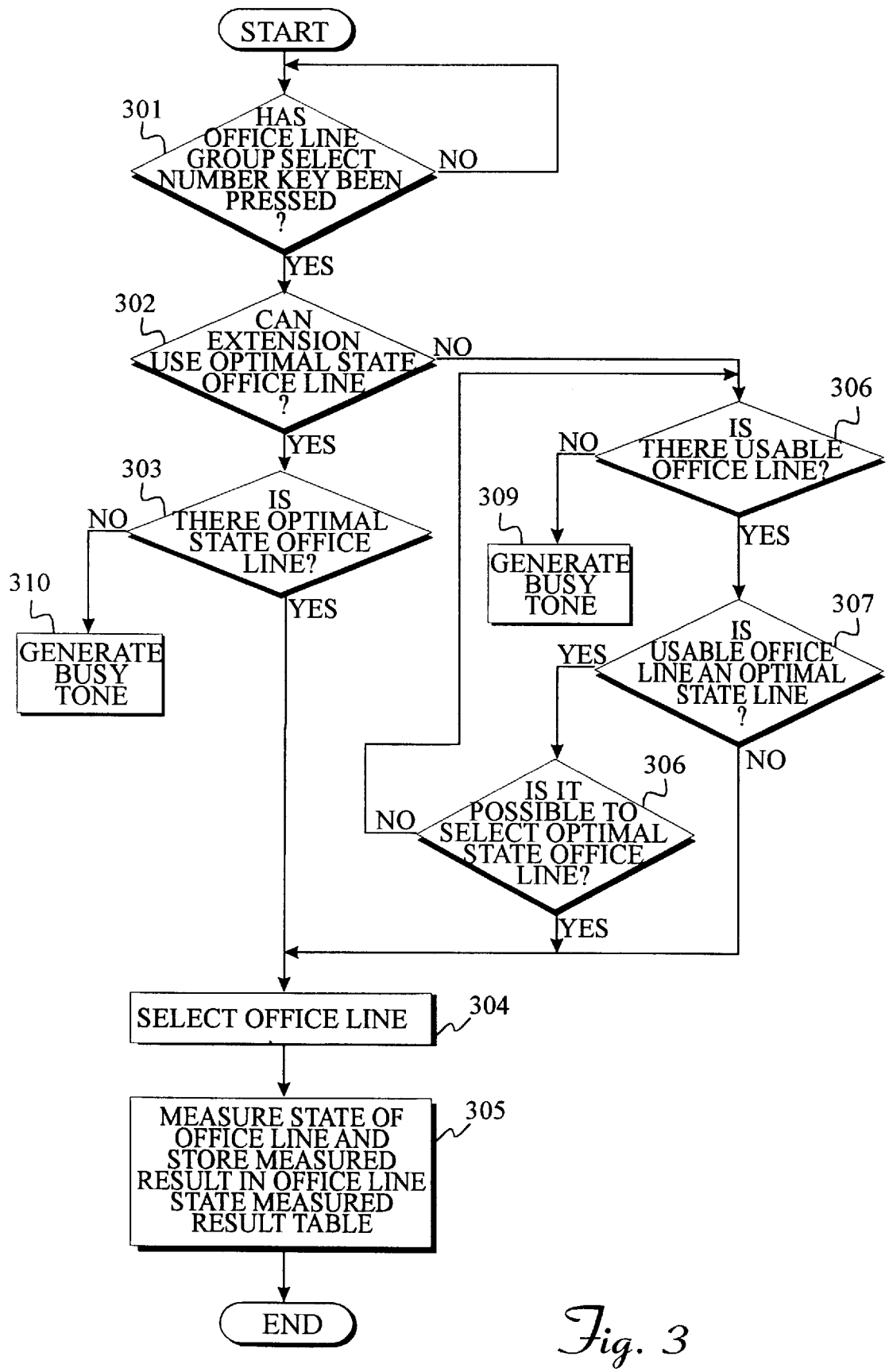
FIG. 3 is a flowchart illustrating when an office line group umber is selected according to the present invention.

FIG. 3 is a flowchart illustrating when an office line group is selected. If a key has been pressed, a determination is made as to whether the pressed key is an office line group select number key at step 301. If so, a determination is made as to whether the extension can use the office line which is in an optimal state at step 302. If the extension can use the office line which is in the optimal state, a determination is made as to whether there is an available office line which is in the optimal state at step 303. If there is no available office line which is in the optimal state, a busy tone is generated at step 310. If there is an office line which is in the optimal state, the office line is selected at step 304. The state of the office line is measured by connecting the office line to an office line state sensor and a measured result is stored in an office line state measured result table at step 305.

Meanwhile, if the extension can not use the optimal state office line, a determination is made as to whether there is a usable office line at step 306. If there is no usable office line, the busy tone is generated at step 309. If there is a usable office line, a determination is made as to whether the usable office line is in an optimal state at step 307. If so, a determination is made as to whether it is possible to select the office line which is in an optimal state by calculating the number of extensions stored in the optimal state office line use table and the order of the line state according to the office line at step 308. If it has been determined that there is no usable office line in an optimal state in step 307, an office line other than an office line in an optimal state is selected in step 304. The office line which is in an optimal state can be continuously re-measured by increasing the number of office lines so as to be 1 more than the number of extensions which can use an office line which is in an optimal state.

As described above, when selecting an office line using the office line group number, an office line having optimal speech sensitivity can be selected with respect to a specific extension. Therefore, the differentiation of service can be achieved by selecting the office line having the optimal speech sensitivity when the extension number which can select an office line which is in an optimal state is received.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An office line selecting method of a telephone switching system for selecting an office line differentiated according to a class of an extension, comprising the steps of:

receiving an extension number so as to select an office line which is in an optimal state with respect to a specific extension;

confirming whether said extension number can use an office line which is in an optimal state when an office line group number consisting of a plurality of office lines is selected through said extension;

checking each office line to measure its state and storing its state in an office line state measured result table; and connecting said specific extension to an office line which has been determined to be in an optimal state using said office line state measured table.

2. An office line selecting method of a telephone switching system as claimed in claim 1, further comprising the step of connecting said specific extension to an office line other than an office line which is in an optimal state when said extension number is not authorized to use an office line which is in an optimal state.

3. An office line selecting apparatus of a telephone switching system for selecting an office line differentiated according to a class of an extension, the apparatus comprising:

a means for receiving an extension number so as to select an office line which is in an optimal state with respect to a specific extension;

a means for confirming whether said extension number can use an office line which is in an optimal state when an office line group number consisting of a plurality of office lines is selected through said extension;

a checking means for checking each office line to measure its state and storing its state in an office line state measured result table; and a means for connecting said specific extension to an office line which has been determined to be in an optimal state by said checking means.

4. An office line selecting apparatus of a telephone switching system as claimed in claim 3, further comprising connecting said specific extension to an office line other than an office line which is in an optimal state when said extension number is not authorized to use an office line which is in an optimal state.

5. An office line selecting method of a telephone switching system for selecting an office line differentiated according to a class of an extension, comprising the steps of:

when a key of an extension has been pressed, determining whether the pressed key is a program key;

if it has been determined that the program key has been pressed, determining whether an optimal line usable number has been received;

if it has been determined that the optimal line usable number has been received, determining if the extension number has been received;

if it has been determined that the extension number has been received, storing the extension number in an optimal state office line use table;

when another key is pressed on an extension, determining whether the pressed key is an office line group select number key;

if it has been determined that the pressed key is an office line group select number key, determining whether the extension can use the office line which is in an optimal state;

if it has been determined that the extension can use the office line which is in the optimal state, determining whether there is an available office line which is in the optimal state;

if it has been determined that there is no available office line which is in the optimal state, then generating a busy tone and alternatively, if it has been determined that there is an office line which is in the optimal state, then selecting the office line and then measuring the state of the office line by connecting the office line to an office line state sensor and storing the measured result in an office line state measure result table;

alternatively, if it has been determined that the extension can not use the optimal state office line, determining whether there is a usable office line;

if it has been determined that there is no usable office line, then generating the busy tone and alternatively, if it has been determined that there is a usable office line, determining whether the usable office line is in an optimal state; and if it has been determined that the usable office line is in an optimal state, then determining whether it is possible to select the office line which is in an optimal state by calculating the number of extension stored in the optimal state office line use table and the order of the line state according to the office line.

* * * * *